US007913075B2

(12) United States Patent
Kalman et al.

(10) Patent No.: US 7,913,075 B2
(45) Date of Patent: Mar. 22, 2011

(54) SYSTEMS AND METHODS FOR AUTOMATIC PROVISIONING OF STORAGE AND OPERATING SYSTEM INSTALLATION FROM PRE-EXISTING ISCSI TARGET

(75) Inventors: Dean Kalman, Cary, NC (US); Jeffrey MacFarland, Wake Forest, NC (US)

(73) Assignee: PMC-Sierra, Inc., Burnaby (CA)

( * ) Notice: Subject to any disclaimer, the term of this patent is extended or adjusted under 35 U.S.C. 154(b) by 504 days.

(21) Appl. No.: 12/167,250

(22) Filed: Jul. 3, 2008

(65) Prior Publication Data

US 2009/0013168 A1     Jan. 8, 2009

Related U.S. Application Data

(60) Provisional application No. 60/947,851, filed on Jul. 3, 2007, provisional application No. 60/947,878, filed on Jul. 3, 2007, provisional application No. 60/947,881, filed on Jul. 3, 2007, provisional application No. 60/947,884, filed on Jul. 3, 2007, provisional application No. 60/947,886, filed on Jul. 3, 2007.

(51) Int. Cl.
G06F 9/24 (2006.01)
(52) U.S. Cl. .......................................... 713/2; 709/222
(58) Field of Classification Search .................. 709/222; 713/2
See application file for complete search history.

(56) References Cited

U.S. PATENT DOCUMENTS

| 7,360,072 | B1 * | 4/2008 | Soltis et al. | 713/1 |
| 7,814,126 | B2 * | 10/2010 | Prabu et al. | 707/804 |
| 2008/0120403 | A1 * | 5/2008 | Lowery et al. | 709/223 |

* cited by examiner

Primary Examiner — Albert Wang
(74) Attorney, Agent, or Firm — Martine Penilla & Gencarella, LLP

(57) ABSTRACT

A method for provisioning a blade server is provided. The method includes creating a server boot image for a blade server, where the boot image includes an operating system image created from a donor server. Then, the method includes inserting the blade server into a chassis of an enclosure that is capable of receiving multiple blade servers. Then, staring the blade server from a pre-boot execution environment (PXE). The PXE loading an image that prompts a user to install a new operating system from a pre-existing target computer of the enclosure. The method then installs the new operating system. The installing includes creation of a new iSCSI target for the inserted blade server, and partitioning of the iSCSI target. The also includes restarting the inserted blade server. The restarting is configured to boot using the iSCSI target of the inserted blade server, so that the inserted blade server becomes a provisioned blade server. The provisioning is accomplished without a hardware iSCSI initiator for an iSCSI boot.

9 Claims, 3 Drawing Sheets

Blade Server Initial Boot

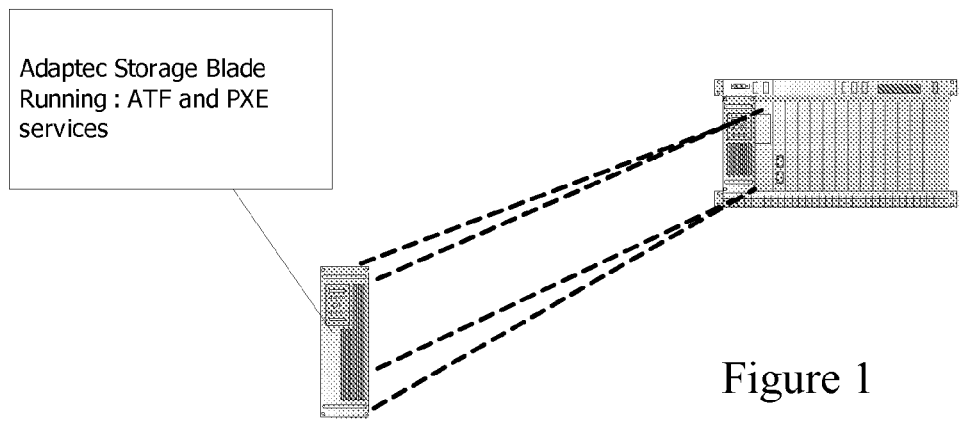
Figure 1
HW Configuration
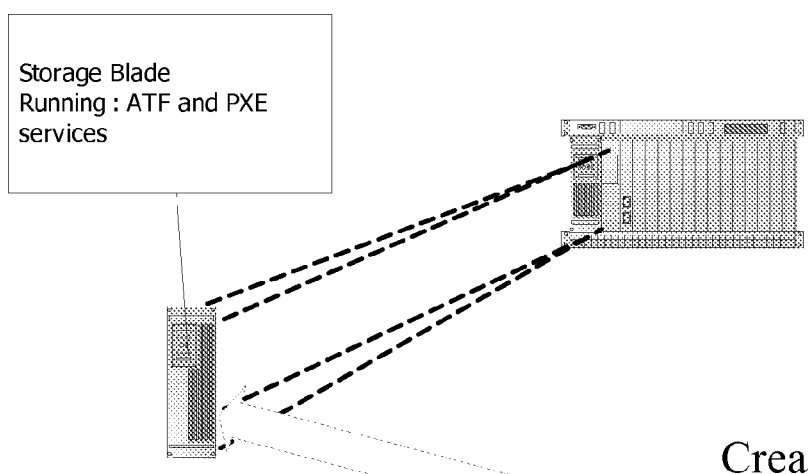
Figure 2
Create/Install initial boot image
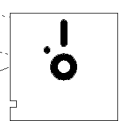
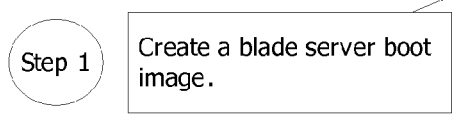
Step 1 — Create a blade server boot image.

Blade Server Initial Boot

Blade Server OS Install

SYSTEMS AND METHODS FOR AUTOMATIC PROVISIONING OF STORAGE AND OPERATING SYSTEM INSTALLATION FROM PRE-EXISTING ISCSI TARGET

CLAIM OF PRIORITY

This application claims the benefit of (1) U.S. Provisional Application No. 60/947,851, filed on Jul. 3, 2007, and entitled "Systems and Methods for Automatic Storage Initiators Grouping in a Multi-Path Storage Environment; (2) U.S. Provisional Application No. 60/947,878, filed on Jul. 3, 2007, and entitled "Systems and Methods for Server-Wide Initiator Grouping in a Multi-Path Storage Environment; (3) U.S. Provisional Patent Application No. 60/947,881, filed on Jul. 3, 2007, and entitled "Systems and Methods for Intelligent Disk Rebuild;" (4) U.S. Provisional Patent Application No. 60/947,884, filed on Jul. 3, 2007, and entitled "Systems and Methods for Logical Grouping of San Storage Zones;" and (5) U.S. Provisional Patent Application No. 60/947,886, filed on Jul. 3, 2007, and entitled "Systems and Methods for Automatic Provisioning of Storage and Operating System Installation," the disclosures of which are incorporated herein by reference.

FIELD OF THE INVENTION

Embodiments of this invention generally relate to provisioning of storage and operating system installation.

BACKGROUND OF THE INVENTION

Currently setting up iSCSI (Internet Small Computer System Interface) storage is a tedious process performed by an end user of IS department. Internet SCSI (iSCSI) is a network protocol standard that allows the use of the SCSI protocol over TCP/IP networks. iSCSI is a transport layer protocol in the SCSI-3 specifications framework. The difficulty of this process is magnified when multiple computers are sharing the iSCSI storage with is typical in a blade server environment.

In view of these issues, embodiments of the invention arise.

SUMMARY

Broadly speaking, embodiments of the invention provide methods and systems for automating the provisioning of storage and eliminate a need for use of hardware (HW) iSCSI initiators in provisioning of the storage.

In one embodiment, method for provisioning a blade server is provided. The method includes creating a server boot image for a blade server, where the boot image includes an operating system image created from a donor server. Then, the method includes inserting the blade server into a chassis of an enclosure that is capable of receiving multiple blade servers. Then, staring the blade server from a pre-boot execution environment (PXE). The PXE loading an image that prompts a user to install a new operating system from a pre-existing target computer of the enclosure. The method then installs the new operating system. The installing includes creation of a new iSCSI target for the inserted blade server, and partitioning of the iSCSI target. The also includes restarting the inserted blade server. The restarting is configured to boot using the iSCSI target of the inserted blade server, so that the inserted blade server becomes a provisioned blade server.

In another embodiment, a system for automatically provisioning storage, which provides remote operating system install, and remote boot capabilities using a single iSCSI target device connected to 1 or more diskless Computers. The embodiments described herein, therefore simplify prior methods, which include the need for 3rd party management software tools to configure the iSCSI storage target. This involves creating LUN's for each blade server and assigning access control. Additionally, a blade server with a HW iSCSI initiator is required to boot from the iSCSI storage target. Then, from a $3^{rd}$ party management software tool, there is a need to configure the HW iSCSI initiator, and then install the desired operating system on the blade server. This process is then repeated for each blade server. The methods defined herein overcome these issues, and simply the provisioning process significantly.

Thus, the embodiments automate the provisioning of storage and eliminate the need for HW iSCSI initiators for iSCSI boot.

Other aspects of the invention will become more apparent from the following detailed description, taken in conjunction with the accompanying drawings, illustrating by way of example the present invention.

BRIEF DESCRIPTION OF THE DRAWINGS

FIG. 1 shows a hardware configuration, in accordance with one embodiment of the present invention.

FIG. 2 shows the creation of a installation of an initial boot image, in accordance with one embodiment of the present invention.

DETAILED DESCRIPTION

Figure 3:
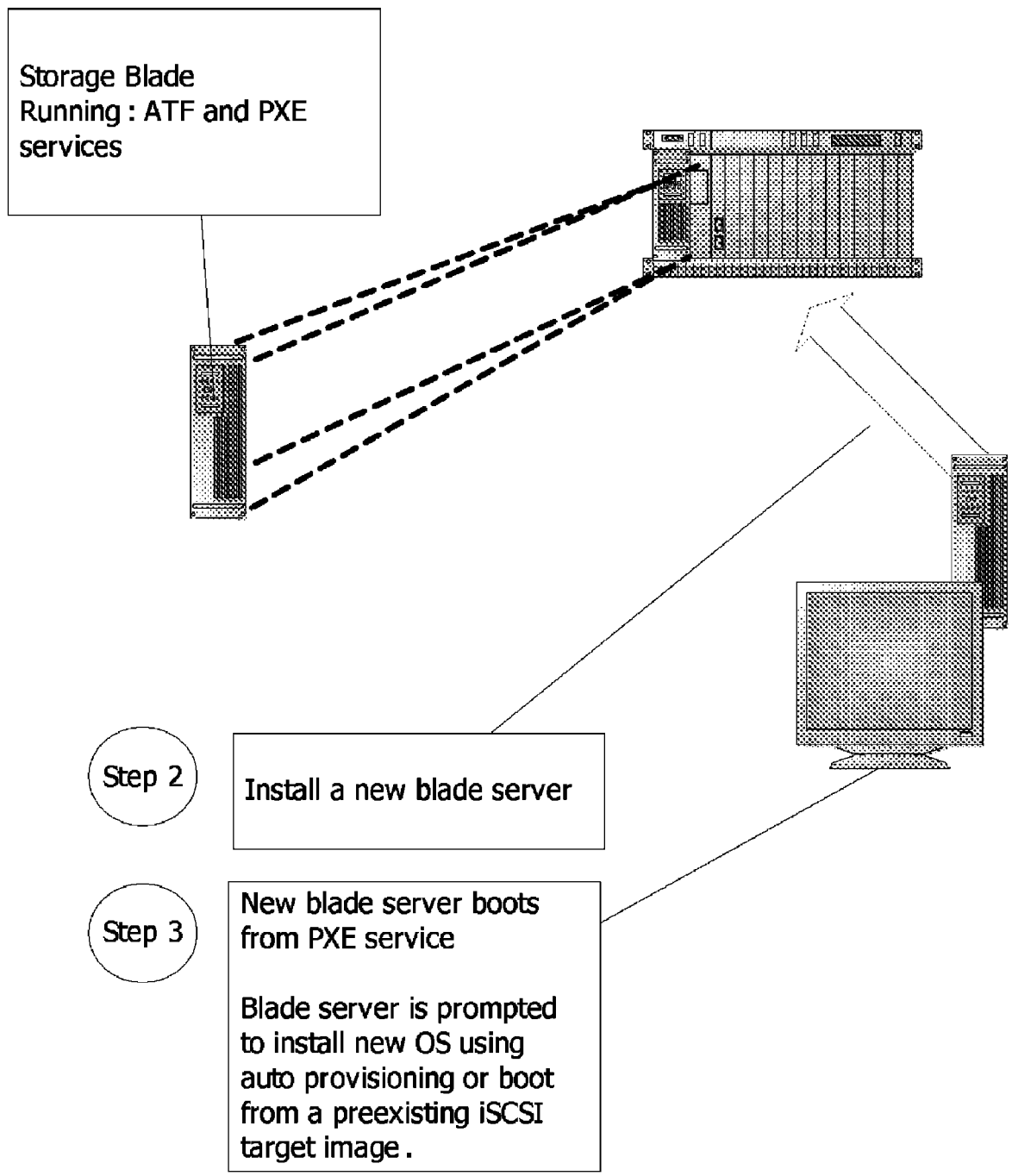
FIG. 3 shows a blade server initial boot, in accordance with one embodiment of the present invention.

Embodiments of the invention provide methods and systems for automating the provisioning of storage and eliminate a need for use of hardware (HW) iSCSI initiators in provisioning of the storage.

Embodiments of this invention provide automatic provisioning of storage, provide remote operating system installation, and provide remote boot capabilities using a single iSCSI appliance connected to one or more diskless computers.

In iSCSI (Internet Small Computer Systems Interface) compliant Storage Area Networks, the SCSI commands are sent in IP packets. Use of IP packets to send SCSI commands to the disk arrays enables implementation of a SAN over an existing Ethernet. Leveraging the IP network for implementing SAN also permits use of IP and Ethernet features, such as sorting out packet routes and alternate paths for sending the packets.

iSCSI is a protocol that allows clients (called initiators) to send SCSI commands (CDBs) to SCSI storage devices (targets) on remote servers. This Storage Area Network (SAN) protocol allows organizations to consolidate storage into data center storage arrays while providing hosts (such as database and web servers) with the illusion of locally-attached disks. Unlike Fibre Channel, which requires special-purpose cabling, iSCSI can be run over long distances using existing network infrastructure.

The current process of setting up Storage Area Network (SAN) storage, getting the storage visible to the blade, and then installing the operating system requires a hardware or hardware assist iSCSI initiator solution on the blade server. The embodiments of the present invention provide the deployment of diskless blade servers in a blade environment.

One embodiment provides a simplified and automatic method of setting up SAN storage, getting the storage visible to the blade, and then installing the operating system for the server blades that support PXE boot. Another embodiment may provide automatic provisioning (e.g. setting up SAN storage, getting the storage visible to the blade, and then installing the operating system) to any diskless server that is utilizing a SAN for backend storage.

The advantages of the present invention are numerous. Most notably, the system and methods described herein eliminate a need for use of HW iSCSI initiators, thereby making the provisioning process efficient and cost effective.

FIG. 1 illustrates a storage blade and slots for multiple server blades within the same enclosure. The storage blade is running the Adaptec iSCSI target framework (ATF) and a Pre-boot Execution Environment (PXE) services. The ATF provides controlling and management functionality for the SAN. Of course, other software that achieves the controlling and management functionality of the SAN can also work, regardless of the maker/designer.

The PXE refers to various methods of getting a computer to boot up without the need for a hard drive or boot diskette. The PXE usually involves booting a computer from firmware that is the data contained on a read-only-memory (ROM) or programmable read-only-memory (PROM) chip. Booting from ROM or PROM eliminates the reliance on an electromechanical device (e.g. hard drives). The use of the PXE enhances reliability and eliminates drive read errors. Due to the fact that reading data from a ROM or PROM is faster than reading data from a hard drive, booting from ROM or PROM is much quicker than booting from a hard drive. The PXE can be also used to boot a computer from a network.

FIG. 2 illustrates a create/install initial boot image step of provisioning of the storage. For preparing the blades for automatic provisioning of storage, the initial server boot image for each blade needs to be created. The initial server boot image can be an entire operating system image included all required drivers, applications, settings, and configurations. In other embodiments, the operating system image can include only the required elements to enable boot. The initial server boot image is typically created by a donor server and then copied on to an iSCSI target on the Storage blade server. The donor server as described herein is a computer that has required drivers, applications, and configurations installed on in the operating system instance of the donor server.

FIG. 3 illustrates steps for installing a new blade server. The new diskless blade server is first inserted in the chassis. The blade server starts up from the PXE service because the blade server has no disk storage to boot. The PXE service loads an image that prompts the user to install a new OS or boot from a pre-existing target image.

Figure 4:
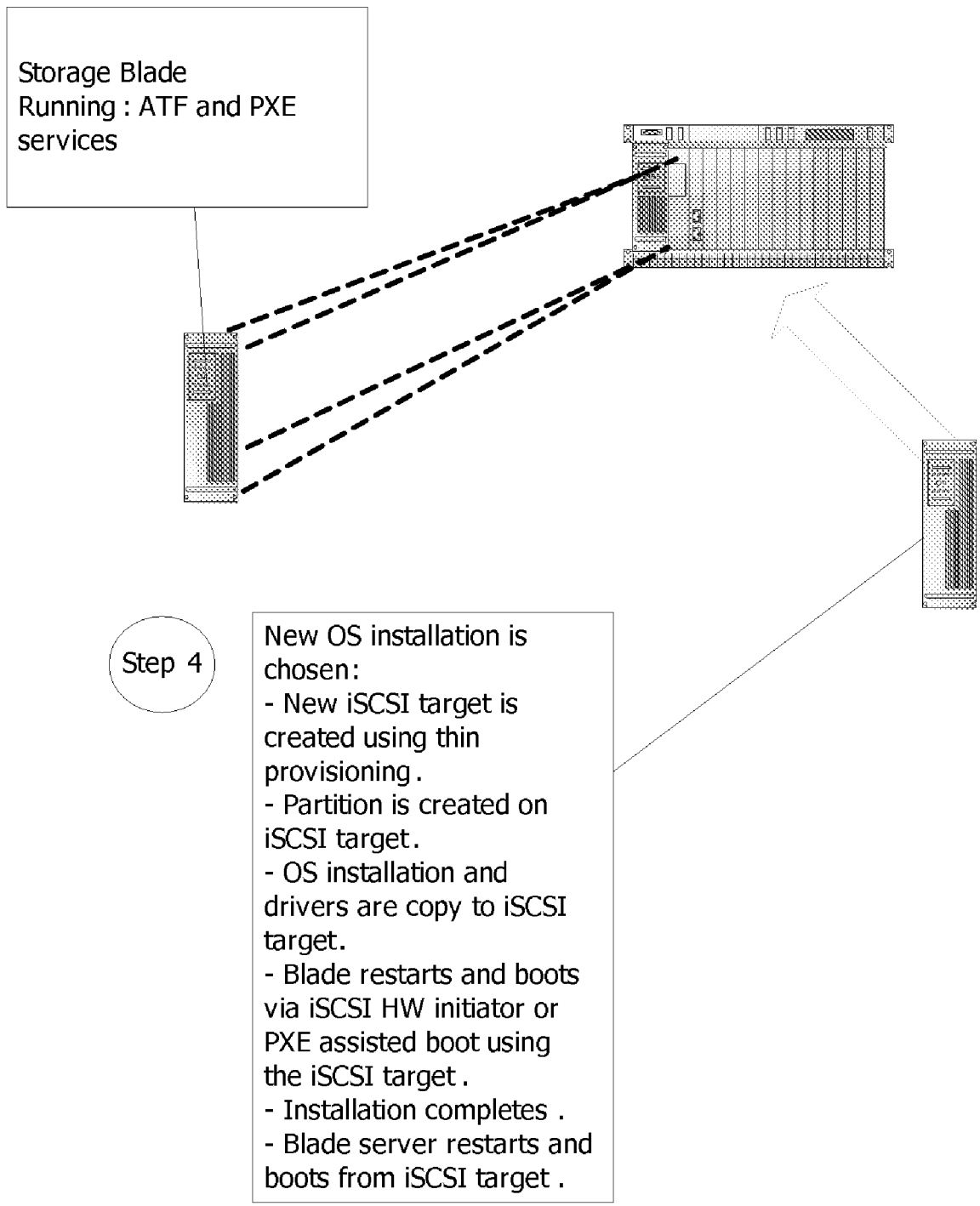
FIG. 4 shows a server operating system install, in accordance with one embodiment of the present invention.

FIG. 4 illustrates steps for installing a new operating system (OS) installation. When a new blade server is incorporated in an appliance, a new iSCSI target is automatically created using a thin provisioning technique and allocated to the server blade. The appliance as described herein is a box including slots for a plurality of server blades, RAID disk arrays, and SAN control and management software to control and manage the server blades, RAID, data buses, and other necessary components of the SAN. The OS pre-install files are copied to the new iSCSI target. This copy of the OS pre-install files is a local copy within the Storage Blade. Hence, the copy operation is completed rather quickly as compared to copying the same data from a source that is outside of the storage blade. The server blade then restarts and using an iSCSI connection or a PXE assisted boot connects back to the storage target and completes the remaining automated portion of the install.

The provisioning of the blade server therefore does not require a manual configuration in order to make it operational in the appliance. The administrator does not need to locate the iSCSI Qualified Names (IQN) of the devices and enter the IQNs during automatic provisioning. IQNs are long and cryptic, making a manual entry prone to errors.

This iSCSI name (ION) type can be used by any organization that owns a domain name. This naming format is useful when an end user or service provider wishes to assign iSCSI names for targets and/or initiators. To generate names of this type, the person or organization generating the name must own a registered domain name. This domain name does not have to be active, and does not have to resolve to an address; it just needs to be reserved to prevent others from generating iSCSI names using the same domain name. Since a domain name can expire, be acquired by another entity, or may be used to generate iSCSI names by both owners, the domain name must be additionally qualified by a date during which the naming authority owned the domain name. For this reason, a date code is provided as part of the "iqn." format. As can be appreciated, simply knowing the naming convention is complicated enough.

Configuration data is maintained on the appliance to enable the appliance to provision the blade server. The configuration data includes the location of the donor server, location of the boot image in the donor server, location of the PXE server. The configuration data may also include data necessary to invoke software components to retrieve IQNs from a newly added blade server and software components to retrieve appliance configuration information including a list of iSCSI targets coupled to the appliance.

With the above embodiments in mind, it should be understood that the invention may employ various hardware and software implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules, page modules, and, subsystems described in this document can be implemented using a programming language such as Flash, JAVA, C++, C, C#, Visual Basic, JAVA Script, PHP, XML, HTML etc., or a combination of programming languages. Commonly available application programming interface (API) such as HTTP API, XML API and parsers etc. are used in the implementation of the programming modules. As would be known to those skilled in the art that the components and functionality described above and elsewhere in this document may be implemented on any desktop operating system which provides a support for a display screen, such as different versions of Microsoft Windows, Apple Mac, Unix/X-Windows, Linux etc. using any programming language suitable for desktop software development.

The programming modules and ancillary software components, including configuration file or files, along with setup files required for installing and related functionality as described in this document, are stored on a computer readable medium. Any computer medium such as a flash drive, a CD-ROM disk, an optical disk, a floppy disk, a hard drive, a shared drive, and an storage suitable for providing downloads from connected computers, could be used for storing the programming modules and ancillary software components. It would be known to a person skilled in the art that any storage medium could be used for storing these software components so long as the storage medium can be read by a computer system.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

As used herein, a storage area network (SAN) is an architecture to attach remote computer storage devices (such as disk arrays, tape libraries and optical jukeboxes) to servers in such a way that, to the operating system, the devices appear as locally attached.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While this invention has been described in terms of several preferable embodiments, it will be appreciated that those skilled in the art upon reading the specifications and studying the drawings will realize various alternation, additions, permutations and equivalents thereof. It is therefore intended that the present invention includes all such alterations, additions, permutations, and equivalents as fall within the true spirit and scope of the claims.

What is claimed is:

1. A method for provisioning a blade server, comprising:
    creating a server boot image for a blade server, the boot image includes an operating system image created from a donor server;
    inserting the blade server into a chassis of an enclosure that is capable of receiving multiple blade servers;
    staring the blade server from a pre-boot execution environment (PXE), the PXE loading an image that prompts a user to install a new operating system from a pre-existing target computer of the enclosure;
    installing the new operating system, the installing including creation of a new iSCSI target for the inserted blade server, and partitioning of the iSCSI target; and
    restarting the inserted blade server, the restarting configured to boot using the iSCSI target of the inserted blade server, so that the inserted blade server is a provisioned blade server.

2. A method for provisioning a blade server as recited in claim 1, wherein the operating system pre-installs files that are copied to the iSCSI target, so that the reinstalled files are local copies within the provisioned blade server.

3. A method for provisioning a blade server as recited in claim 2, wherein the inserted server blade restarts, and using an iSCSI connection or a PXE assisted boot, connects back to the iSCSI target and completes a remaining automated portion of the install of the operating system.

4. A method for provisioning a blade server as recited in claim 1, wherein the iSCSI target includes configuration data that includes data necessary to invoke software components to retrieve IQNs from a newly added blade server and software components to retrieve appliance configuration information including a list of iSCSI targets coupled to the appliance.

5. A method for provisioning a blade server as recited in claim 1, wherein the provisioning is accomplished without a hardware iSCSI initiator for an iSCSI boot.

6. A method for provisioning a blade server, comprising:
    creating a server boot image for a blade server, the boot image includes an operating system image created from a donor server;
    inserting the blade server into a chassis of an enclosure that is capable of receiving multiple blade servers;
    staring the blade server from a pre-boot execution environment (PXE), the PXE loading an image that prompts a user to install a new operating system from a pre-existing target computer of the enclosure;
    installing the new operating system, the installing including creation of a new iSCSI target for the inserted blade server, and partitioning of the iSCSI target; and
    restarting the inserted blade server, the restarting configured to boot using the iSCSI target of the inserted blade server, so that the inserted blade server is a provisioned blade server, wherein the provisioning is accomplished without a hardware iSCSI initiator for an iSCSI boot.

7. A method for provisioning a blade server as recited in claim 6, wherein the operating system pre-installs files that are copied to the iSCSI target, so that the reinstalled files are local copies within the provisioned blade server.

8. A method for provisioning a blade server as recited in claim 7, wherein the inserted server blade restarts, and using an iSCSI connection or a PXE assisted boot, connects back to the iSCSI target and completes a remaining automated portion of the install of the operating system.

9. A method for provisioning a blade server as recited in claim 6, wherein the iSCSI target includes configuration data that includes data necessary to invoke software components to retrieve IQNs from a newly added blade server and software components to retrieve appliance configuration information including a list of iSCSI targets coupled to the appliance.

* * * * *